June 15, 1965 W. A. JACOBS ETAL 3,189,399
FORMING MACHINE AND PROCESS
Filed Oct. 13, 1961 6 Sheets-Sheet 1

INVENTORS
WILLIAM A. JACOBS
KENNETH A. HORNUNG
BY Fisher, Christen & Goodson
ATTORNEYS June 15, 1965

W. A. JACOBS ETAL 3,189,399

FORMING MACHINE AND PROCESS

Filed Oct. 13, 1961

INVENTORS
**WILLIAM A. JACOBS
KENNETH A. HORNUNG**

BY *Fisher, Christen, & Goodson*

ATTORNEYS

June 15, 1965 W. A. JACOBS ETAL 3,189,399
FORMING MACHINE AND PROCESS
Filed Oct. 13, 1961 6 Sheets-Sheet 5

INVENTORS
**WILLIAM A. JACOBS
KENNETH A. HORNUNG**

BY Fisher, Christen and Goodson

ATTORNEYS

INVENTORS
WILLIAM A. JACOBS
KENNETH A. HORNUNG
BY Fisher, Christen and Goodson
ATTORNEYS

3,189,399
FORMING MACHINE AND PROCESS
William A. Jacobs, Ellenville, and Kenneth A. Hornung, Kerhonkson, N.Y., assignors to Sun Chemical Corporation, New York, N.Y., a corporation of Delaware
Filed Oct. 13, 1961, Ser. No. 145,541
16 Claims. (Cl. 18—19)

This application is a continuation-in-part of application Serial No. 124,659, filed July 17, 1961, now abandoned.

This invention relates to a forming machine for converting sheet material into a molded article and, more particularly, relates to a machine for drawing thermoplastic sheet material to form shaped articles.

It is a principal object of this invention to provide a machine for converting sheet material, e.g., foamed plastic sheet material, into shaped articles at high rates of production.

It is another object to provide a machine for quickly forming a roll or other package of continuous length sheet material into a multitude of shaped articles in the least amount of time and with the least amount of manual labor.

It is a further object to provide a machine for effecting the above conversion to result in accurately formed articles substantially free of objectionable distortions, bows, thinning, bunching and the like.

A further object is the provision of an apparatus which is substantially automatic.

A still further object is the provision of an apparatus which is adjustable to convert a roll or other package of thermoplastic sheet material into a variety of shaped or molded articles of different shapes and sizes.

A further object is the provision of an apparatus for making shaped articles from sheet material with a minimum of heat-induced contraction of said sheet material.

Further objects and advantages of this invention will become apparent from the following detailed description taken in conjunction with the appended drawings in which.

Figure 1:
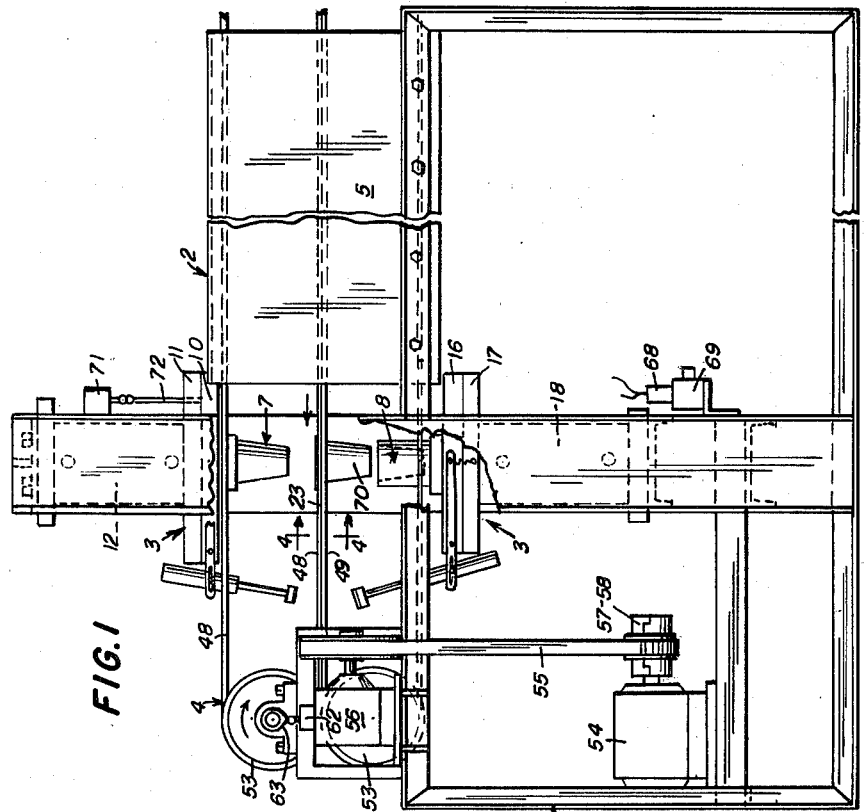
FIG. 1 is a side elevation in partial cutaway of the novel machine.

Referring now to FIG. 1 there is shown a frame 1 on which is mounted heating zone 2, drawing means 3, conveying means 4 and various control accessories thereto. The heating zone essentially comprises a four-walled tunnel 5 having inwardly directed heating lamps 6, e.g., of the infra-red type, mounted on the ceiling and floor of said tunnel. A temperature gradient is preferably provided in the heating zone such that the entrance portions are maintained at lower or more moderate temperatures than the intermediate portions which in turn are maintained at lower or more moderate temperatures than the exit portions adjacent to the former and die assemblies 7 and 8. This is conveniently accomplished by regulating the supply of electrical power to the bank of infra-red lamps in the entrance portions, the intermediate portions and the exit portions by any suitable means, e.g., rheostat means. Temperature regulation as described above can also be accomplished by regulating the size or number of lamps operating in the respective portions of the heating zone 2 such that smaller or fewer lamps are operating in the entrance portions and successively larger or more lamps are operating in the intermediate portions and exit portions. In any event the temperature at any point in the heating zone 2 should never be permitted to reach or exceed the melting point of the sheet material 23; otherwise under sagging, distorting and even breaking of said material takes place. It is sufficient that the exit temperature of the sheet material 23 be high enough to render said material pliable and formable, e.g., within the softening point range of said material.

Figure 3:
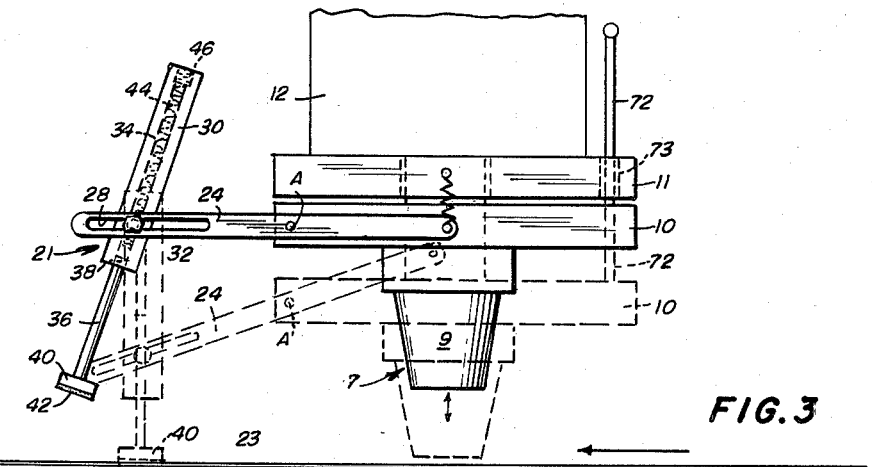
FIG. 3 is a side elevation in partial cutaway of portions of the drawing means which is a component of the novel machine shown in FIGS. 1 and 2.
Figure 4:
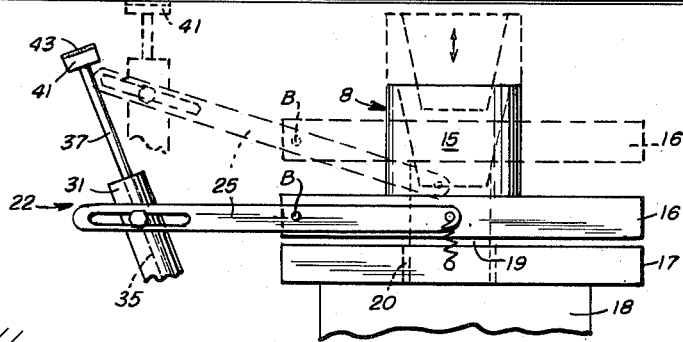
FIG. 4 is an enlarged cross-sectional view taken on line 4—4 of FIG. 1.

The drawing means 3, as best shown in FIGS. 3 and 4, comprises a former assembly 7 and a die assembly 8. The former assembly 7 comprises a shaped former 9 mounted on a vertically movable upper platen 10, which is guided for non-rotating, straight-line movement by suitable guides (not shown), and an upper stationary platen 11, on which is mounted an air or hydraulic upper cylinder 12. The piston rod 13 of the upper cylinder 12 passes freely through a port 14 centrally provided in the upper stationary platen 11 and is connected to the upper movable platen 10 for motivating said upper movable platen, vertically.

The die assembly 8 comprises a die 15 mounted on a vertically movable lower platen 16, which is guided for non-rotating, straight-line movement by suitable guides (not shown), and a lower stationary platen 17, on which is mounted an air or hydraulic lower cylinder 18 as shown. The piston rod 19 of the lower cylinder 18 passes freely through a port 20 centrally provided in the lower stationary platen 17 and is connected to the lower movable platen 16 for motivating said lower movable platen vertically. The die 15 and the shaped former 9 are alined for mating engagement when said die is raised and said former is lowered.

A pair of upper and lower retaining means 21 and 22 are provided on each side of the upper and lower movable platens 10 and 16, and each pair cooperates to grip the sheet material 23 passing between the former 9 and die 15 just prior to mating of said former and die. Each retaining means 21 (22) comprises an arm 24 (25) pivotally mounted at an intermediate point A (B) thereof to the movable platen 10 (16). The inner end of each arm 24 (25) is connected through a spring 26 (27) to the respective stationary platen 11 (17) and is provided with a longitudinal slot 28 (29) in its outer end portions. A leg 30 (31) is fixedly mounted on each arm 24 (25) by a set screw 32 (33) passing through the slot 28 (29) and threaded into said leg, such that there is no rotation of said leg with relation to said arm. The leg 30 (31) is provided with a longitudinal bore 34 (35) extending from the upper end thereof and terminating short of the lower end thereof and a coaxial bore of smaller diameter extending through the lower end of said leg so as to provide an annular shoulder at the bottom of said longitudinal bore 34 (35). A shaft 36 (37) having a head 38 (39) at its upper end and a foot 40 (41) provided with a tread 42 (43) of friction material such as rubber is slideably mounted with its head 38 (39) within the longitudinal bore 34 (35) and its foot 40 (41) disposed outside of said bore. The head 38 (39) is of a slightly smaller diameter as the longitudinal bore 34 (35) so as to be slideable therein and is prevented from dropping out of said bore by the annular shoulder. A coil spring 44 (45) is disposed within the bore 34 (35) above the head 38 (39) of the shaft 36 (37) and a threaded plug 46 (47) closes off the upper end of said bore to contain said coil spring within said bore.

It is important that the tread 42 (43) of the foot 40 (41) makes contact with the sheet material 23 prior to contact therewith by the former 9 and die 15. The longitudinal slot 28 (29) formed in the outer end portions of the arm 24 (25) permits adjustment of the leg 30 (31) to regulate the point of vertical movement of the movable platen 10 (16) at which the tread 42 (43) of foot 40 (41) makes contact with the sheet material 23. This adjustment permits the use of formers 9 and dies 15 of different depths as will become more readily apparent hereinafter.

Figure 2:
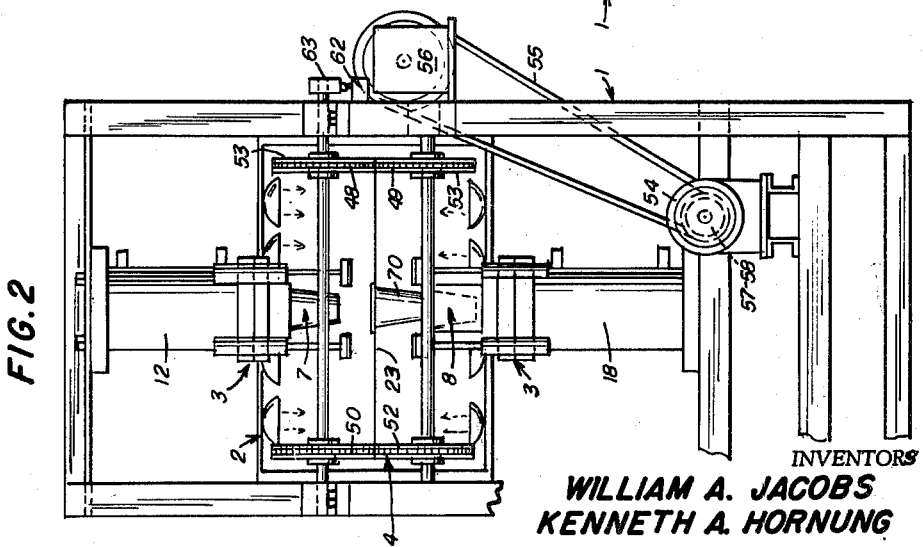
FIG. 2 is an end elevation in partial cutaway of the novel machine.

The conveying means 4, as shown in FIGS. 1 and 2, comprises a pair of vertically disposed, sprocket-driven, continuous chains 48–49 and 50–51 along each edge of the sheet material 23. Each chain pair has an upper chain 48 (50) and a lower chain 49 (51). The upper and lower chains 48 (50) and 49 (51) respectively, of each pair are substantially coplanar and the lower length of the upper chain 48 (50) normally tightly engages the upper length of the lower chain 49 (51) such that sheet material disposed between them is tightly gripped. As best shown in FIG. 4 the outer surface of each link of the chains 48, 49, 50 and 51 are provided with friction treads 52 such as rubber so as to better grip the sheet material 23.

Each chain 48, 49, 50 and 51 is mounted by vertical sprocket wheels 53 at each end thereof. The sprocket wheels 53 are driven by an electric motor 54, operating at constant speed, via pulley 55 and gear box 56. The upper and lower chains 48 (50) and 49 (51) respectively of each pair are synchronized by any suitable means, e.g., gears or chain and sprocket means (not shown), and the sprockets 53 at each end of upper chains 48 and 50 are commonly shafted as are the sprockets at each end of lower chains 49 and 51.

Figure 5:
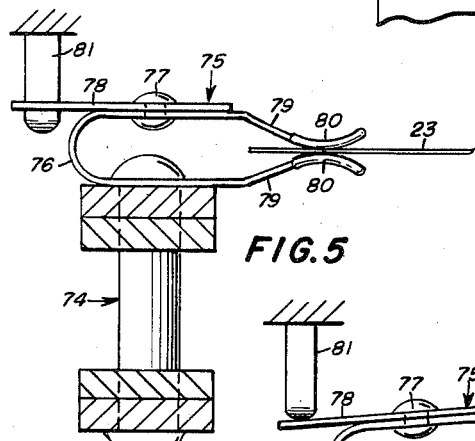
FIG. 5 is an enlarged cross-section of an alternative continuous chain and gripping means which can be employed in conveying sheet material in our novel machine.
Figure 6:
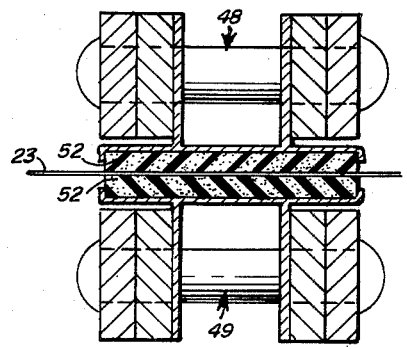
FIG. 6 is a cross-section of the chain and gripping means shown in FIG. 5 illustrating the gripping means in open position.

An alternative conveying means comprises a horizontal disposed chain 74 the top of which is substantially coplanar with the sheet material 23 as best shown in FIGS. 5 and 6. In this embodiment there are but two continuous chains 74 along opposite edges of the sheet material 23 and driven by sprocket wheels which are substantially coplanar and which are commonly driven at about the same rates of speed as described above. Fixed to the upper sides of the chains 74 at spaced intervals are spring clips 75 formed of spring metal and having a U-shaped body 76, one side of which is fastened to the chain 74 and the other side of which is fastened as by rivets 77 to an action arm 78 which extends beyond said U-shaped body. The U-shaped body extends inwardly toward the sheet material 23 into converging fingers 79 which are covered with suitable friction or tread material 80, e.g., rubber, for gripping said sheet material. In the closed or normal position of the spring clip 76 the fingers 79 are strongly urged together to tightly grip the sheet material 23 therebetween. At each end of each continuous chain 74 a stationary cam bar 81 is mounted over the inner path, adjacent the edges of the sheet material 23, to be followed by clips 75 as they move with said chain. The under surface of the cam bars 81 are sloped upwardly in both directions from a point just above that at which the spring clips 75 meet or leave the edges of said sheet material. At this point the action arm 78 of each spring clip 75 is fully depressed by the cam bar 81 acting thereon to fully open the fingers 79 of said spring clip to receive or release said sheet material 23 as best shown in FIG. 6. In either direction from this point the action arm 78 is less than fully depressed and gradually is not depressed at all by the cam bar 81. Thus, as the chain 74 rounds the sprocket wheel to meet the sheet material 23 the cam bar 81 meets the action arm 78 and gradually depresses it until the fingers 79 are opened at which point the spring clip 74 meets said sheet material and said cam bar begins to slope away from said clip to ease up on said action arm and then release it completely permitting the full tension of said spring clip to cause said fingers to tightly grip said sheet material. As the chain 74 approaches the point of departure of the spring clip 75 from the sheet material 23 the cam bar 81, sloping downwardly, engages the action arm 78 to force it downwardly until, at the release point, the fingers 79 are wide open and said sheet material is released and as the chain 74 turns around the sprocket wheel adjacent the release point the spring clip 75 is moved away from the sheet material 23 and the cam bar 81 slopes away from the action arm 78 to release it, allowing the spring clip 75 to close.

Figure 7:
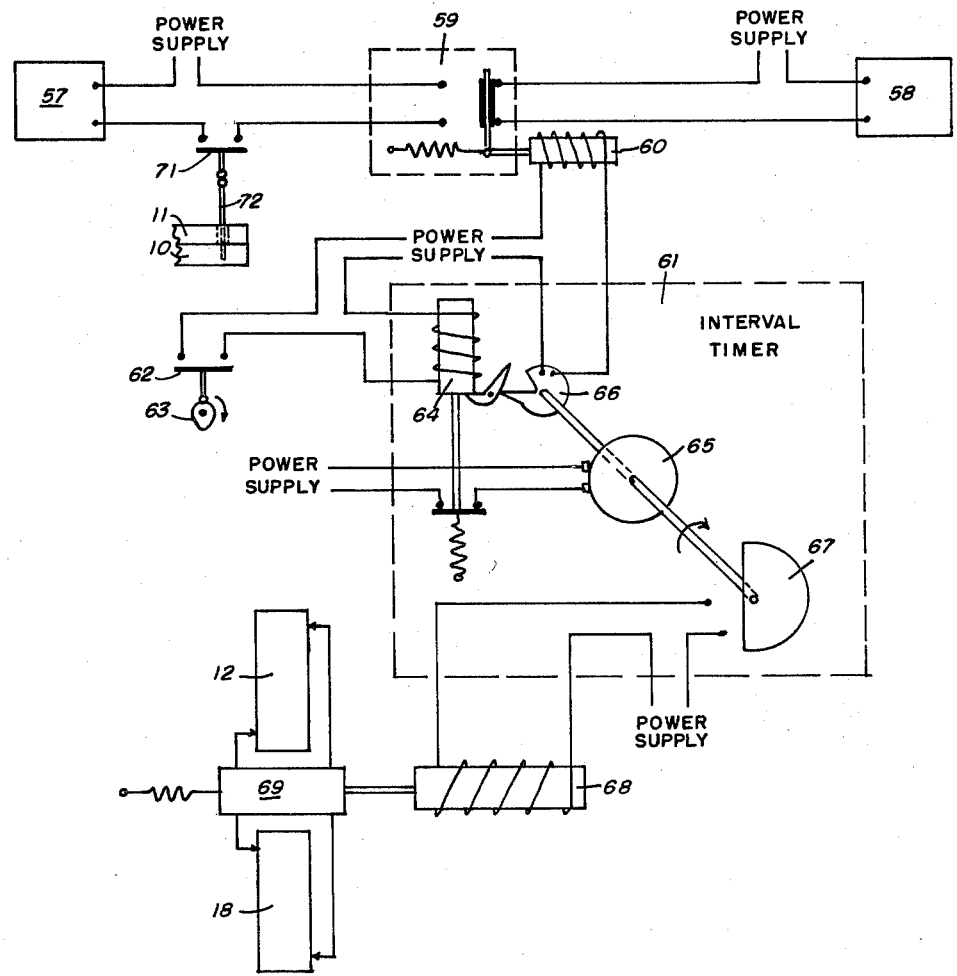
FIG. 7 is a diagrammatic wiring diagram illustrating the various control elements of the novel machine.
Figure 8:
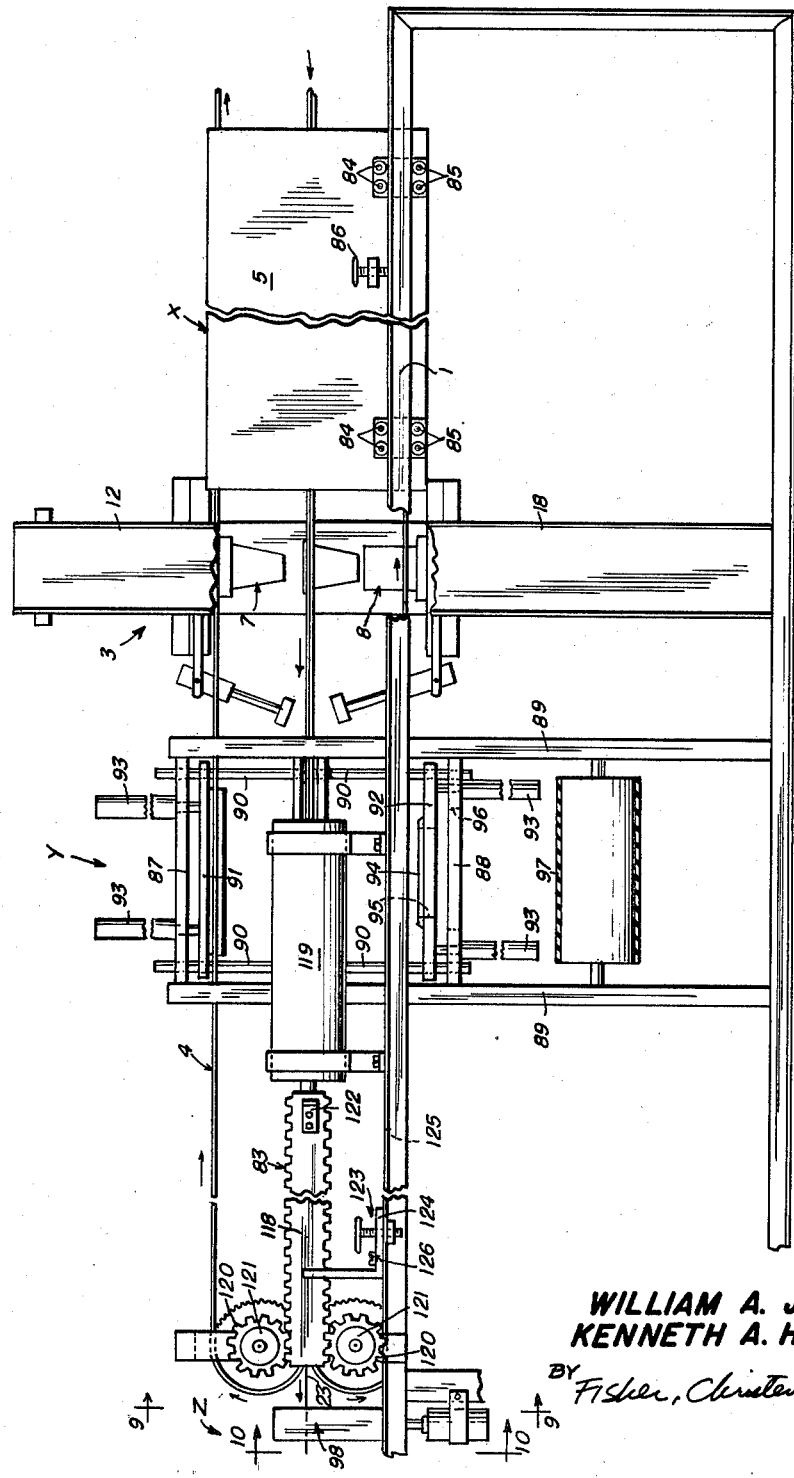
FIG. 8 is a side elevation in partial cutaway of another embodiment of the novel machine.
Figure 9:
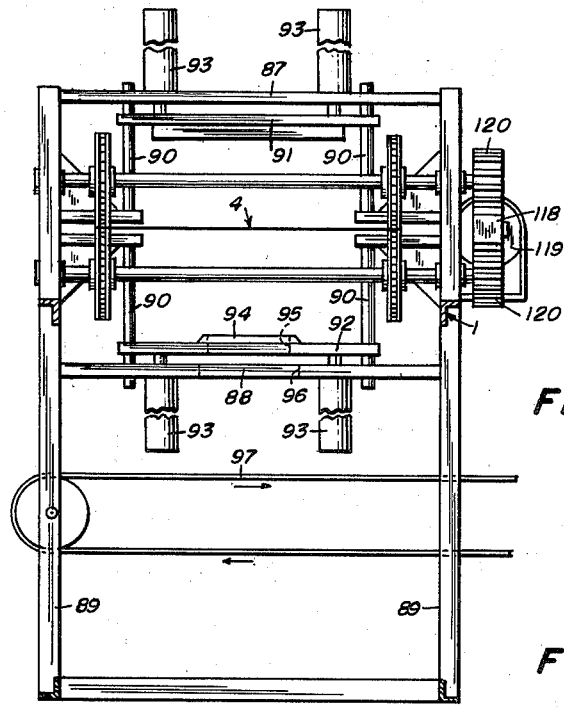
FIG. 9 is an end elevation taken generally on line 9—9 of FIG. 8.

The electric motor 54 is drivably connected to the pulley 55 through a magnetic clutch 57 and brake 58 which, as best shown in FIG. 7, is controlled by a single pole, double throw switch 59 wherein the normally open terminals thereof are in the magnetic brake circuit such that the brake 58 is normally de-energized and non-operative and the normally closed terminals are in the magnetic clutch circuit such that the clutch 57 is normally energized and operative. The switch arm of the single pole, double throw switch is controlled by a switch solenoid 60 which is energized by an interval timer 61 to open the clutch circuit and close the brake circuit. The timer 61 is initiated by a microswitch 62 which cooperates with a cam 63 rotated by the shaft of sprocket 53 to actuate said microswitch 62 at predetermined length intervals. The microswitch 62 energizes the timer solenoid 64 which latches in the on position to connect the timer motor 65 to power; thus, the cam 63 can over-ride the microswitch 62 dye to the inertia of the conveying system without interrupting the timing cycle of the timer 61. The timer motor 65 rotates timer contact 66 to energize switch solenoid 60 to open the clutch circuit and de-energize clutch 57 and close the brake circuit and energize the brake 58 thus disconnecting sprockets 53 from the motor 54 and stopping the chain pairs 48–49 and 50–51. At the same time, the timer motor 65 rotates the timer contact 67 to energize valve solenoid 68 which controls a four-way valve 69 operating the air or pneumatic cylinders 12 and 18 to move the movable platens 10 and 16 toward each other. After the platens 10 and 16 have mated and remained so for a sufficient period to form the sheet material 23 into a shaped article 70, the timer-contact 67 de-energizes the valve solenoid 68 to actuate the four-way valve 69 which operates the cylinders 12 and 18 to move the platens 10 and 16 away from each other toward their respective rest positions. The timer 61 and especially the timer contact 66 can be adjusted to regulate the duration of mating contact between the movable platens 10 and 16 and the air or pneumatic system can be adjusted to regulate the speed at which said movable platens approach or move away from each other.

As the platens reach or nearly reach, their respective rest positions, timer contact 66 de-energizes the switch solenoid 60 to allow the single pole, double throw switch 59 to open the brake circuit and release the brake 58 while closing the clutch circuit to place the clutch 57 in an otherwise engageable condition. At approximately the same time or shortly thereafter, the timer solenoid 64 is released, as by a suitable latch release arm rotated by the timer motor 65 synchronously with timer contacts 66 and 67, to disconnect the timer motor 65 from power and stop it.

In order to ensure that the conveying means 4 does not begin operation until the movable platens 10 and 16 have completely cleared the sheet material 23 and shaped article 70 a safety microswitch 71 is provided in the clutch circuit and is mounted adjacent the upper portions of upper cylinder 12 and is actuated by a control rod 72 mounted on the upper movable platen 10 and slideably passing upward through a hole 73 in the upper stationary platen 11. The control rod 72 and safety microswitch 71 are alined and said microswitch is so positioned and said control rod is of such a length that when the upper movable platen 10 is in its uppermost rest position, i.e., the end of a drawing cycle, the safety microswitch 71 is actuated and in turn closes the clutch circuit to place the clutch 57 in an otherwise engageable condition. When the movable platen 10 is below its uppermost rest position the safety microswitch 71 is open as is the clutch circuit and regardless of the disposition of switch 59, the clutch 57 will not be energized to recommence operation of the conveying means 4. The length of control rod 72 can be varied to regulate the point at which safety microswitch 71 is closed.

The air or pneumatic cylinders 12 and 18 are operated by fluid from a fluid supply source (not shown) connected thereto through the four-way valve 69 controlled by the valve solenoid 68. The interval timer 61 sequentially activates and deactivates the valve solenoid 68 as described above to alternately admit fluid to the outer chambers of the respective cylinders 12 and 18 (while venting the inner chambers thereof) to move the movable platens 10 and 16 toward each other into drawing or shaping positions, and to admit fluid to the inner chambers of said respective cylinders (while venting the outer chambers thereof) to move the movable platens 10 and 16 away from each other into rest position. When the movable platens 10 and 16 come together the sheet material 23 disposed therebetween is drawn to form the shaped article 70. The interval timer 61 can be adjusted to provide the desired or necessary residence time in the drawing position to permit proper cooling and setting of the sheet material 23 drawn between the shaped former 9 and the die 15 and to provide the desired or necessary time in the rest position to allow removal of the shaped article 70 and disposition of the undrawn sheet material 23 between said former and die by the action of the conveying means 4 initiated when the control rod 72 contacts and actuates safety microswitch 71 as movable platen 10 approaches or reaches its rest position. In order to provide adequate and rapid setting of the sheet material 23 after it is shaped, the former 9 and die 15 are preferably cooled as by any suitable cooling means, e.g., circulating cooling water through channels formed in said former and die. The cooling should be controlled so as not to freeze the sheet material 23 prior to completion of forming and prevent said sheet material from forming without breaking or rupturing; it usually being sufficient to cool said material to a temperature below that at which it emerges from the heating zone 2.

In overall operation, sheet material 23 is fed, from rolls thereof or other suitable equipment holding same into the nips of the chain pairs 48–49 and 50–51 from the right of the apparatus shown in FIG. 1 and is clamped along one edge between chains 48 and 49 and along the other edge between chains 50 and 51. The chain pairs 48–49 and 50–51 then carry the sheet material 23 into the oven 5 where it is gradually heated to drawing temperature as it passes therethrough. Sprockets 53 driven by the motor 54 via magnetic clutch 57, pulley 55 and gear box 56 provide motivation to the chain pairs 48–49 and 50–51. The cam 59 biased to synchronous rotation with the sprockets 53 actuates the timer 61 as hereinabove described to disengage the clutch 57 and engage the brake 58 to thereby stop rotation of said sprockets and halt movement of the sheet material 23.

Operation of the drawing means 3 is initiated by the timer 61 as hereinabove described by energizing the valve solenoid 68 and thus activating the four-way valve 69 to result in movement of the platens 10 and 16 toward mating engagement. Just before the shaped former 9 and die 15 make contact with the sheet material 23 the treads 42 and 43 of feet 40 and 41, respectively, contact directly opposite face areas of said sheet material to prevent longitudinal movement of said sheet material. As the shaped former 9 and die 15 contact the sheet material 23 and continue to move into mating engagement with each other the compressive force exerted by the treads 42 and 43 on said sheet material increases due to compression of coil springs 44 and 45 in the respective legs 30 and 31, resulting in increased bias against longitudinal movement of said sheet material as it is being drawn.

When the shaped former 9 and die 15 are in complete mating engagement and the formed sheet material has set sufficiently into the shaped article 70, the timer de-energizes the valve solenoid 68 to reverse valve 69 resulting in movement of the platens 10 and 16 away from each other toward their respective rest positions. As the platens 10 and 16 reach their rest positions the timer 65 de-energizes the switch solenoid 60 thereby deactivating the brake 58 and closes the clutch circuit and safety microswitch 71 is closed by control rod 72 to close the clutch circuit and the clutch 57 is activated to motivate the conveying means 4 and recommence the next cycle. The conveying means 4 moves the shaped article 70 out of the machine whereupon it is cut and trimmed as desired.

FIGS. 8 through 13 illustrate another embodiment of the novel forming machine having additional features including a movable heat zone X, a trimming zone Y, a cutting zone Z, and a drive means 83 for the conveying means 4. The drawing means 3 is identical to that of the machine shown in FIGS. 1 through 7. The conveying means 4 also is identical to that shown in FIGS. 1 through 7, with the exception of the drive means 83 therefor. The movable heating zone comprises a four-walled tunnel 5 constructed similarly as that shown in FIGS. 1 and 2. The tunnel 5 has mounted on each side thereof two pairs of upper guide wheels 84, riding on the upper side of frame 1, and two pairs of lower guide wheels 85, riding on the lower surface of upper frame 1, and is free to move along the frame 1. Also mounted on each side of the tunnel 5 is a screw clamp 86 which is adapted to bear against the frame 1 to hold the oven against movement along said frame. In this manner, the tunnel 5 can be moved closer to or further away from the drawing means 3 to adapt to different sizes of former and die assemblies 7 and 8.

The trimming zone Y comprises an upper stationary plate 87 and a lower stationary plate 88 mounted on upright posts 89 between the chain pairs 48–49 and 50–51. Four guide rods 90 are mounted on and extend between the upper and lower stationary plates 87 and 88. An upper movable plate 91 and lower movable plate 92 are slideably mounted on said guide rods for movement toward and away from each other. Pneumatic or hydraulic cylinders 93 are mounted on the upper and lower stationary plates 87 and 88 and have piston rods which are fixed to the upper and lower movable plates 91 and 92 for providing moving force respectively thereto. The lower movable plate 92 is provided with a die 94 of a desired shape on its upper surface. The upper movable plate 91 has a lower surface of a material which is softer than the die 94 so as to form a cutting surface therefor. The lower stationary plate and the lower movable plate are provided with central openings 95 and 96 for allowing material cut by the cooperative action of the die and cutting surface to drop. Vertically below the central openings 95 and 96 is mounted a conveyor belt 97 for removing material cut by the cooperative action of the die 94 and cutting surface.

Figure 10:
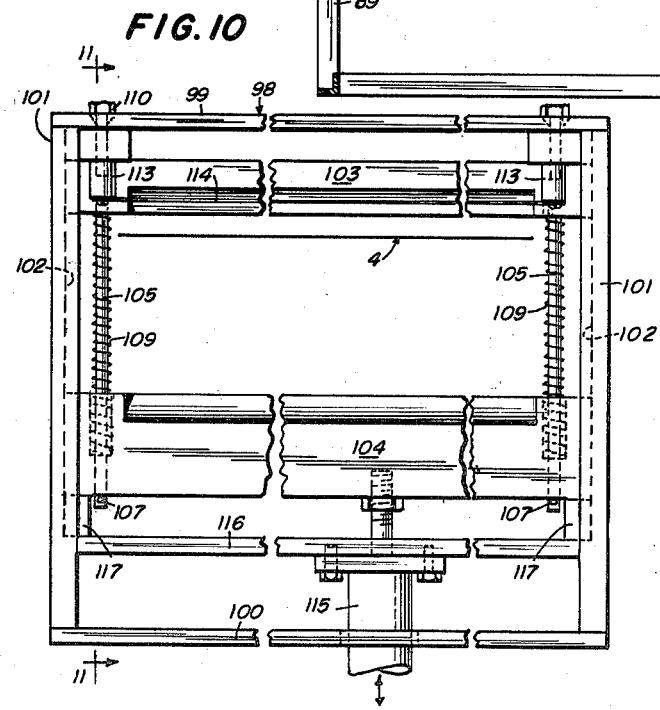
FIG. 10 is a section taken on line 10—10 of FIG. 8.
Figure 11:
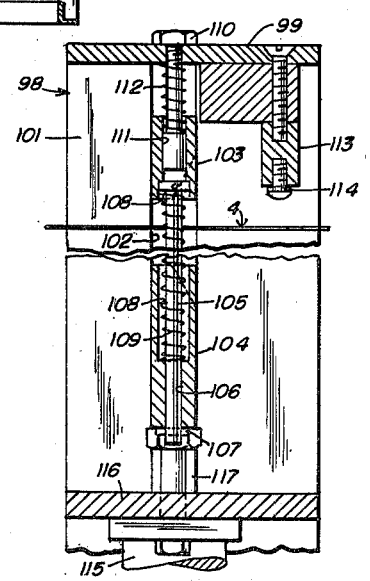
FIG. 11 is a section taken on line 11—11 of FIG. 10.

In the event that the trimming device Y is not employed, the cutting zone Z can be operated to cut the sheet material 23 and thus sever the formed articles 70 from each other. The cutting zone is best illustrated in FIGS. 10 and 11, wherein there is shown a fixed housing 98 comprising an upper wall 99, a lower wall 100, and two side walls 101. Each of the side walls 101 has a vertical channel 102 formed on its inner surface. Slidably mounted in the channel are an upper gripping bar 103 and a lower gripping bar 104. The upper gripping bar 103 has a guide pin 105 fixed to it at each end. The guide pin 105 extends downwardly and passes through an alined bore 106 in the lower gripping bar 104 and passes to the under side of said lower gripping bar. A lock pin 107 is provided on the lower end of guide pin 105 to prevent slippage of the lower gripping bar off of said guide pin. Suitable recesses 108 are provided in the upper side of lower gripping bar 104 and the under side of said upper gripping bar 103 to accommodate and seat a coil spring 109 disposed around the guide pin 105. The coil spring 109 urges the upper and lower gripping bars 103 and 104 away from each other and supports the upper gripping bar 103 in an uppermost position within the channels 102. A guide bolt 110 fastened to the upper wall 99 slideably engages a guide recess 111 in the upper side of upper gripping bar 103. A recoil spring 112 is disposed about the guide bolt 110 and engages the upper wall 99 and the upper surface of upper gripping bar 103 to urge same away from each other.

Terminal posts 113 are mounted at each end of upper wall 99 and project downwardly from said upper wall. A wire adapted to be heated to sufficiently high temperature to melt the thermoplastic sheet material 23 when brought into contact therewith is mounted on and stretched between the terminal posts 113. The wire 114 is preferably of the resistance type which becomes heated by passing electrical current therethrough, for example, Nichrome wire.

An air cylinder (not shown), having a piston rod 115 which passes through the lower wall 100, is mounted below the lower gripping bar 104. A drive plate 116 is mounted on the piston rod 115 and extends between and engages the side walls 101 for guidance during movement in a vertical direction. The drive plate 116 is provided at each end with keys 117 which ride in the channels 102 and engage the lower surface of lower gripping bar 104 to move same vertically. It will thus be seen that when the piston rod 115 moves upwardly, the lower gripping bar 104 is raised and is guided in its upward movement by channels 102. As lower gripping bar 104 elevates it compresses coil spring 109 which, in turn, bears against upper gripping bar 103 to urge it upwardly. However, the resistance of recoil spring 112 urging said upper gripping bar downwardly prevents any appreciable upward movement of said gripping bar. As lower gripping bar 104 continues its upward movement, it engages the sheet material 23 and moves it upwardly into contact with the lower surface of upper gripping bar 103. When this occurs the lower gripping bar 104 engages the upper gripping bar 103 through the sheet material 23 and transmits the upward force of piston rod 115 to said upper gripping bar to overcome the resistance of recoil spring 112, thereby moving said upper gripping bar in an upward direction. The sheet material 23 gripped between the upper and lower gripping bars 103 and 104 is thus moved upwardly for a short distance until it contacts the heated wire 114 and is cut thereby. The severed piece of sheet material 23 then falls away from the heated wire 114 and the piston rod 115 then retracts.

The drive means 83 comprises a double sided rack 118 connected to a drive air cylinder 119 and driveably engaging pinion gears 120 mounted on upper and lower sprockets 53 through over-riding clutches 121. When the air cylinder 119 is actuated, the double sided rack 118 is moved in the machine direction and turns the pinion gears 120 which engage the sprockets 53 to turn said sprockets and thus move the chain pairs 48-49 and 50-51, thus advancing the sheet material 23 in the machine direction. When the air cylinder is actuated in the opposite direction, rack 118 retracts, turning pinion gears 120 in the opposite direction but not turning the sprockets 53 because of the over-ride operation of clutches 121. A fixed stop 122 is mounted on the side of rack 118 and projects outwardly therefrom. An adjustable stop 123 is mounted on the upper side of frame 1 adjacent the rack 118. The adjustable stop comprises an L-bar 124 which rides on the upper surface of frame 1. A guide slot 125 is provided in said upper surface to receive a guide screw 126 which is fixed to the lower leg of L-bar 124. A screw clamp 127 is threaded through the lower leg of the L-bar and passes through the slot 125. A clamping nut 128 is threaded onto the lower end of screw clamp 127 below the upper frame 1, such that when said screw clamp is tightened up on said clamping nut the L-bar is fixed in relation to the frame 1. The upper leg of L-bar 124 projects upwardly into the path of fixed stop 122 mounted on rack 118, such that in its forward movement said fixed stop engages said adjustable stop to arrest the forward movement of the rack 118. The adjustable stop can be moved toward or away from the fixed stop 122 in order to adjust the distance of movement of rack 118 and, thus, the extent of movement of the sheet material 23, such that former assemblies 7 and die assemblies 8 of various sizes can be accommodated.

Figure 12:
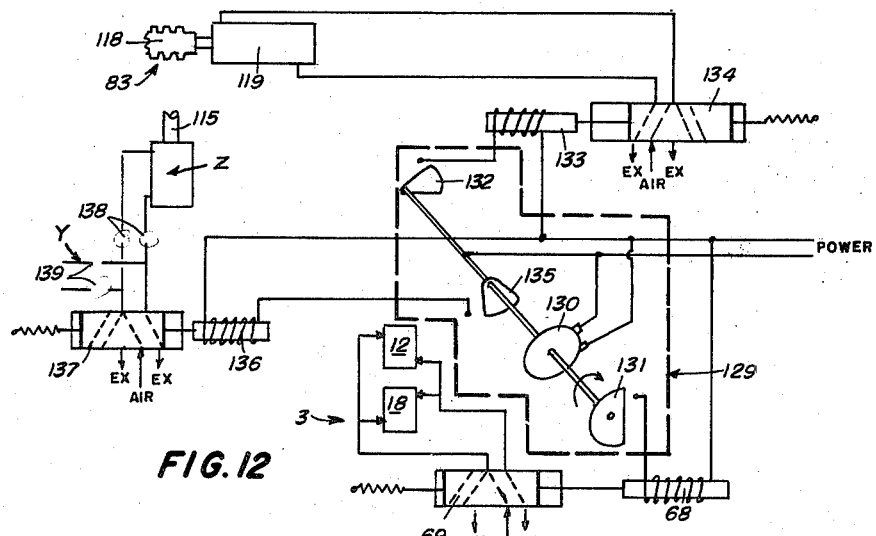
FIG. 12 is a diagrammatic wiring and pneumatic diagram illustrating the various control elements of the embodiment shown in FIGS. 8 through 11.
Figure 13:
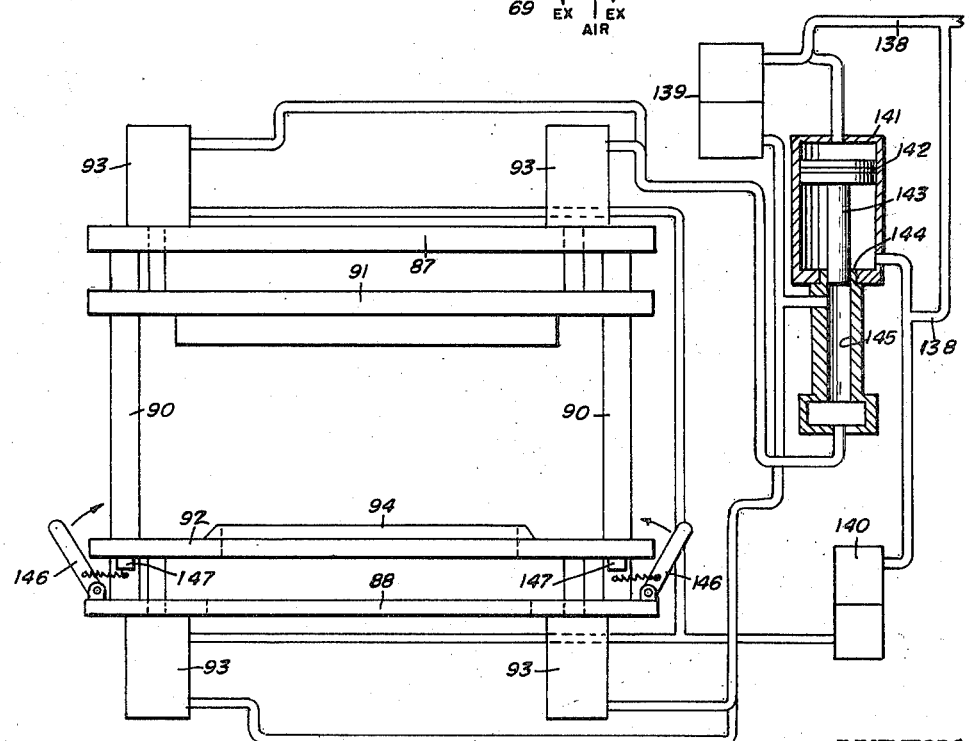
FIG. 13 is a pneumatic diagram illustrating the control elements of the cutting section of the embodiment shown in FIGS. 8 through 11.

Referring now to FIG. 12, there is shown an electrical and pneumatic circuit for operating and controlling the drawing means 3, the cutting means Z, the drive means 83 and, in conjunction with FIG. 13, the trimming means Y. An interval timer 129 controls the initiation of operation of the above-mentioned means. The interval timer comprises a constant speed timer motor 130 which rotates former timer contact 131 to energize or de-energize solenoid 63 which, in turn, operates four-way valve 69 which then supplies air to the upper and/or lower portions of cylinders 12 and 18 as hereinbefore described in regard to FIG. 7. At the same time, timer motor 130 rotates mover timer contact 132 which de-energizes or energizes a mover solenoid 133 which, in turn, actuates a three-way valve 134 which controls air supply or exhaust to each side of the drive air cylinder 119 to move the rack 118 forwardly or to retract said rack. A trimmer-cutter timer contact 135 is also rotated by the motor 130 to energize or de-energize trimmer-cutter solenoid 136 which controls a trimmer-cutter four-way valve 137 which, as shown, controls air supply or exhaust to the cutter air cylinder which, in turn, provides movement to cutter piston 115. The four-way valve 137 also controls the air supply or exhaust to the trimmer means as will be hereinafter more fully described with regard to FIG. 13. Valves 138 are disposed in the pneumatic lines to the cutter air cylinder and valves 139 are provided in the pneumatic lines to the trimmer means 131 to permit selective operation of the cutting means Z or the trimmer means Y or to permit non-operation of both said means. It will be noted that the timer contacts 131, 132, and 135 are all phased, such that the cutting means Z and the trimming means Y are actuated when the drawing means 3 is actuated and are de-actuated along with drawing means 3 when the drive means 83 is actuated in a forward direction.

Referring now to FIG. 13, there is shown a fluid pressure system for operating the trimming means Y. Air lines 138 connect trimmer-cutter four-way valve 137, shown in FIG. 12, to air oil tanks 139 and 140. The air side of air oil tank 139 is also connected to the upper end of a pressurizing tank 141 and the air side of air oil tank 140 is also connected to the lower side of said pressurizing tank. The pressurizing tank 141 comprises a piston head 142 which separates the upper and lower ends of said tank. The piston head 142 is connected to a piston 143 which is slideably mounted by a seal 144 in a bore 145 provided in the lower portions of the pressurizing tank 141, such that no fluid below said piston rod can escape upwardly past the seal 144. The upper portion of the bore 145 communicates with the oil side of air oil tank 139 and the lower portion of said bore communicates with the upper side of upper hydraulic cylinders 93, the piston rods of which are driveably connected to the upper movable plate 91. The oil side of air oil tank 139 is connected to the lower side of lower cylinders 93, the piston rods of which are driveably connected to the lower movable plate 92. The oil side of air oil tank 140 communicates with the lower side of upper cylinders 93 and the upper side of lower cylinders 93. As air is supplied to the air oil tank 139, it pressurizes the oil therein to supply oil to the outer sides of all cylinders 93. The pressurized oil from tank 139 is transmitted to upper cylinders 93 through the bore 145 in the lower portion pressurizing tank 141. At the same time that air is supplied to air oil tank 139, it is also supplied to the upper side of pressurizing tank 141 to force the piston head 142 and piston rod 143 downwardly. As the piston rod 143 moves downwardly it reaches a point where it de-communicates the bore 145 from the air oil tank 139. As the piston rod 143 continues its downward movement, the oil in bore 145 is pressurized above the oil in the air oil tank 139. This occurs just as the upper movable plate and lower movable plate reach each other and provides increased thrust to the upper movable plate 91 against lower movable plate 92, such that the cutting surface of said upper movable plate is vigorously forced against the die 94 to cleanly cut through sheet material disposed between said plates. Support feet 146 are pivotally mounted on lower stationary plates 88 and are spring urged upwardly and inwardly against lower movable plate 92 and as said lower movable plate is about to meet upper movable plate 91, the feet 146 are in a vertical supporting position. Stops 147, mounted on the under side of lower movable plate 92, prevent excessive movement of support feet 146 beyond the vertical supporting position. The support feet 146 thus take the brunt of the force exerted by the pressurized oil supplied to the upper cylinders 93 and provide firmness to the cutting die 94. When the air side of air oil tank 139 is connected to exhaust by four-way valve 137 and the air side of air oil tank 140 is connected to air supply by solenoid 137, the oil in air oil tank 140 is pressurized to supply pressurized oil to the cylinders 93 to move plates 91 and 92 away from each other. At the same time air is supplied to the lower side of the pressurizing tank 141 to act upon the lower side of piston head 142 and move same upwardly. Thus the pressurized oil in upper cylinders 93 is released and de-pressurized into air oil tank 139. A suitable oil cylinder operating off of the oil side of air oil tank 140 retracts suupport feet 146 to permit lower plate 92 to move downwardly.

What is claimed is:

1. Apparatus for converting thermoplastic sheet material into shaped articles comprising in line a heating zone, for heating said sheet material, drawing means for forming shaped articles from said sheet material and a delivery zone for delivering said shaped articles, said drawing means comprising a retractable shaped former, a retractable die having a cavity substantially mating with said former and retractable retaining means operating on that portion of said sheet material between said drawing means and said delivery zone for holding said portion against substantial longitudinal displacement during drawing said shaped former and die being movable toward each other for mating engagement to draw the portion of sheet material disposed therebetween; actuating means for intermittently actuating said retaining means, said shaped former and said die to draw and form a portion of said sheet material disposed therebetween into a shaped article and thereafter retracting said retaining means, shaped former and die; and moving means for intermittently moving said sheet material to remove said shaped articles and to pass undrawn following sheet material from said heating zone into stationary shaping position between said shaped former and said die while moving additional undrawn following sheet material into said heating zone, said moving means being actuated when said retaining means, shaped former and die are in their retracted position.

2. Apparatus as claimed in claim 1 wherein said moving means comprises continuous chain means adapted to grip the edges of said sheet material and extending through said heating zone and past said drawing means, to dispose said sheet material within said heating zone and thereafter between said drawing means.

3. Apparatus as claimed in claim 1 wherein said moving means comprises two pairs of continuous chains each disposed at opposite edges of said sheet material, one chain of each pair bearing on one face of an edge portion of said sheet material and the other chain of said pair bearing on the opposite face of said edge portion to thereby grip said edge portion, said continuous chain pairs extending on either side of and past said heating zone and said drawing means.

4. Apparatus as claimed in claim 1 wherein said retractable retaining means comprises a pair of opposing foot elements adjacent to said shaped former and die, each of said foot elements being adapted to bear against an opposite intermediate face of said sheet material when actuated to grip it against substantial longitudinal movement during drawing.

5. Apparatus as claimed in claim 1 wherein said heating zone is movable towards and away from said drawing means.

6. Apparatus for converting thermoplastic sheet material into shaped articles comprising in line a heating zone, for heating said sheet material, drawing means for forming shaped articles from said sheet material and a delivery zone for delivering said shaped articles; retractable retaining means operating on that portion of said sheet material between said drawing means and said delivery zone for holding said portion; continuous conveying means for moving said sheet material through said heating zone and into stationary drawing position in said drawing means while preventing substantial transverse contraction of said sheet material; and control means for sequentially actuating said conveying means while deactuating said drawing means and retracting said retaining means and deactuating said conveying means while actuating said drawing means and retaining means.

7. Apparatus as claimed in claim 6 wherein said conveying means comprises two pairs of continuous chains each disposed at opposite edges of said sheet material, one chain of each pair bearing on one face of an edge portion of said sheet material and the other chain of said pair bearing on the opposite face of said edge portion to thereby grip said edge portion, said continuous chain pairs extending on either side of and past said heating zone and said drawing means.

8. Apparatus as claimed in claim 7 wherein said chains are driven by sprockets driveably connected to a drive source, said control means to deactuate said chain is a magnetic clutch activated by cam and switch means governed by the rotation of said sprockets to disconnect said sprockets from said drive source at predetermined degrees of sprocket rotation; said control means to actuate said chain is a switch operated by said drawing means at the end of each drawing cycle to deactivate said clutch and reconnect said sprockets to said drive source; and said control means to actuate and deactuate said drawing means is a timer.

9. Apparatus as claimed in claim 6 wherein said conveying means comprises continuous chain means adapted to grip the edges of said material and extending past said heating zone and said drawing means, to dispose said sheet material within said heating zone and thereafter between said drawing means.

10. Apparatus as claimed in claim 6 wherein the heating zone is temperature controlled to provide higher temperatures in portions of said zone nearer said drawing means and lower temperatures in portions of said zone further from said drawing means.

11. Apparatus as claimed in claim 6 wherein said drawing means comprises a retractable shaped former and a retractable die having a cavity substantially mating with said former, said die and former being movable toward each other for mating engagement to draw a portion of said sheet material disposed therebetween and retractable retaining means movable with said former and die to grip said portion of sheet material against substantial longitudinal movement.

12. Apparatus as claimed in claim 11 wherein said drawing means is equipped with cooling means to maintain said former and die below the temperature of said sheet material emerging from said heating zone and above the hardening temperature of said sheet material.

13. Apparatus as claimed in claim 6 wherein said conveying means comprises two pairs of continuous chains, each disposed at opposite edges of said sheet material, one chain of each pair bearing against one face of an edge portion of said sheet material and the other chain of said pair bearing against the opposite face edge portion to thereby grip said edge portion, said continuous chain pairs extending on either side of and past said heating zone and said drawing means, and drive means comprising sprocket and shaft means at each end of said chains, pinion gear means connected to said sprocket and shaft means through an over-riding clutch, rack means driveably engaging said pinion gear means to rotate same, and means for successively actuating said rack means in two directions.

14. Apparatus as claimed in claim 6 wherein hot wire means is associated with said conveying means to contact said sheet material to successively sever said shaped articles from each other.

15. Apparatus as claimed in claim 6 wherein alined cutting die means and cutting surface means are disposed facing opposite surfaces of said sheet material beyond said drawing means and actuating means are provided for successively moving said cutting die means and cutting surface means toward each other to engage and cut said sheet material and sever shaped articles therefrom and away from each other to release said sheet material.

16. Apparatus as claimed in claim 15 wherein conveying means are provided in association with said cutting die means and cutting surface means to remove shaped articles cut from said sheet material.

References Cited by the Examiner

UNITED STATES PATENTS

| | | |
|---|---|---|
| 2,017,459 | 10/35 | Howe et al. |
| 2,229,613 | 1/44 | Strauch _____ 18—19 |
| 2,490,781 | 12/49 | Cloud _____ 18—19 XR |
| 2,522,956 | 9/50 | Middleton _____ 18—19 |
| 2,677,747 | 5/54 | Jaye. |
| 2,778,765 | 1/57 | Dym _____ 18—19 XR |
| 2,836,852 | 6/52 | Butzko _____ 18—19 |
| 2,962,758 | 12/60 | Politis _____ 18—19 |
| 2,967,328 | 1/61 | Shelby et al. _____ 18—19 |
| 2,979,771 | 4/61 | Taber _____ 18—19 |
| 3,026,566 | 3/62 | Martelli et al. _____ 18—19 |
| 3,036,336 | 5/62 | Menkel _____ 18—19 XR |

WILLIAM J. STEPHENSON, *Primary Examiner.*

MICHAEL V. BRINDISI, *Examiner.*